(12) United States Patent
Takagi

(10) Patent No.: US 6,912,058 B1
(45) Date of Patent: Jun. 28, 2005

(54) IMAGE FORMING APPARATUS AND IMAGE PROCESSING APPARATUS FOR PRINTING CODE PATTERN AND METHOD FOR PRINTING CODE PATTERN

(75) Inventor: Shiro Takagi, Inagi (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 937 days.

(21) Appl. No.: 09/663,687

(22) Filed: Sep. 19, 2000

(30) Foreign Application Priority Data

Oct. 27, 1999 (JP) .......................................... 11-305593

(51) Int. Cl.[7] ...................... B41B 15/00; G06F 15/00
(52) U.S. Cl. ...................... 358/1.1; 358/1.16; 358/1.18
(58) Field of Search ......................... 358/1.1, 1.6, 1.8; 399/364, 373

(56) References Cited

U.S. PATENT DOCUMENTS 6,116,510 A * 9/2000 Nishino ..................... 235/494

6,611,352 B2 * 8/2003 Suzuki et al. .............. 358/1.18

FOREIGN PATENT DOCUMENTS

JP          10-224540          8/1998          ............ H04N/1/00

* cited by examiner

*Primary Examiner*—Gabriel Garcia
*Assistant Examiner*—Thierry L Pham
(74) *Attorney, Agent, or Firm*—Foley & Lardner LLP

(57) ABSTRACT

An image forming apparatus includes a creating portion for determining whether or not document data give have a capacity greater than a first predetermined value, and creating code patterns by encoding the document data as it is, if the controller determines that the document data have a capacity smaller than the first predetermined value, a creating portion for reducing the document data by a second predetermined value and creating code patterns by encoding the thus reduced document data, if the controller determines that the document data have a capacity greater than the first predetermined value, and an printing engine for forming the thus created code patterns and the document data on a sheet of paper. With this arrangement, it is possible to print even large-capacity document data on the back of the sheet of paper in the form of code patterns.

8 Claims, 6 Drawing Sheets

```
page                              //START OF PAGE
sheet,A4,(3000,4000)              //SHEET:SIZE,NUMBER OF PIXELS(x,y)
font,times,12,black               //FONT:NAME,POINT,COLOR
text,(150,100),"Test Document"    //CHARACTER STRING:DRAWING POSITION(x,y),
                                    "CHARACTER STRING"
image,(100,200,2000,2000),256,0x0A8...0  //IMAGE:REGION(x,y,width,height),NUMBER OF COLORS,
                                           image-data
end                               //END OF PAGE
```

FIG. 3

```
page                              //START OF PAGE
sheet,A4,(3000,4000)              //SHEET:SIZE,NUMBER OF PIXELS(x,y)
font,times,12,black               //FONT:NAME,POINT,COLOR
text,(150,100),"Test Document"    //CHARACTER STRING;DRAWING POSITION(x,y),
                                    "CHARACTER STRING"
image,(100,200,2000,2000),256     //IMAGE:REGION(x,y,width,height),NUMBER OF COLORS
end                               //END OF PAGE
```

FIG. 6

IMAGE FORMING APPARATUS AND IMAGE PROCESSING APPARATUS FOR PRINTING CODE PATTERN AND METHOD FOR PRINTING CODE PATTERN

CROSS-REFERENCE TO RELATED APPLICATIONS

This application is based upon and claims the benefit of priority from the prior Japanese Patent Application No. 11-305593, filed Oct. 27, 1999, the entire contents of which are incorporated herein by reference.

BACKGROUND OF THE INVENTION

The present invention relates to a method and apparatus for printing electronic document data containing a large amount of image data such as graphic images on a sheet of paper, and restoring the original electronic document data based on the data printed on the sheet of paper.

There has been conventionally known an apparatus for reading data printed on a paper sheet through a scanner and creating electronic document data including characters and images, for example, in order to reuse the contents of the documents printed on the distributed sheet of paper.

Jpn. Pat. Appln. KOKAI Publication No. 10-224540 discloses a digital copier which creates electronic document data by recognizing code patterns which are easy to read for computers such as griff code (Xerox USA) and bar codes and printed on paper.

Such conventional systems however take a long time to recognize characters and still cannot recognize 100% of the letters. As a result, inaccurate electronic document data are created.

Moreover, if the print data to be converted to electronic data contain e.g. color images and thus the amounts of data are large, it may be difficult to print all the code patterns corresponding to the entire print data on e.g. the back of the sheet. In such a case, it is impossible to create electronic document data.

Thus, in a conventional arrangement, it is difficult to restore electronic document data if the print data containing e.g. color images and thus all the code patterns corresponding to the entire print data cannot be printed.

BRIEF SUMMARY OF THE INVENTION

An object of the present invention is to provide an image processing apparatus and a method which can restore electronic document data including image data such as color graphics and thus large in data size and thus makes it possible to raise the upper limit of the size of electronic document data as an original of paper document distributed.

According to the present invention, there is provided an image forming apparatus comprising: a controller for determining whether or not document data given have a capacity larger than a first predetermined value; a first code pattern creating portion for creating code patterns by encoding the document data if the controller determines that the document data have a greater capacity than the first predetermined value; a reducing portion for reducing the document data by a second predetermined value if the controller determines that the document data have a greater capacity than the first predetermined value; a second code pattern creating portion for encoding the document data reduced by the reducing portion to create code patterns; and a print function for forming images on a recording medium based on the code patterns created by at least one of the first code pattern creating portion and the second code pattern creating portion.

With this arrangement, even if document data including e.g. image data cannot be converted to printable code patterns because the document data are too large in size, the image data are deleted with only the document data retained. Thus, it is possible to print only the document data on the front side of the sheet, and print code patterns such as bar codes corresponding to the document data on the back of the sheet.

From another aspect of the invention, there is provided an image forming apparatus comprising: a scanner for reading code patterns on a recording medium; a creating portion for recognizing the code patterns read by the scanner and creating temporary document data based the code patterns; a controller for determining whether or not predetermined image data have been deleted based on the code patterns recognized by the creating portion; a controller for determining the temporary document data created by the creating portion as final document data if the controller determines that no data have been deleted from the code patterns; and a supplementing portion for restoring predetermined data from data other than the code patterns and incorporating the restored predetermined data into the temporary document data created by the creating portion to restore the final document data if the controller determines that the predetermined data have been deleted from the code patterns.

The present invention also provides an image processing apparatus for reading the code patterns printed on the back of the sheet of paper and judging whether or not data such as image data have been deleted when the code patterns are printed by the abovementioned image forming apparatus. If image data are determined to have been deleted, the images printed on the front side of the sheet are read and incorporated into the code patterns obtained from the code patterns. With this arrangement, it is possible to print or store even document data containing image data, which were heretofore been unhandlable, through code patterns such as bar codes.

The image forming apparatus and the image processing apparatus according to the present invention can be used for the image forming method and image processing method of the present invention.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 shows an example of electronic document data;

FIG. 6 is shows electronic document data with the image data deleted; and

DETAILED DESCRIPTION OF THE INVENTION

The embodiment of the invention is now described with reference to the drawings.

Figure 1:
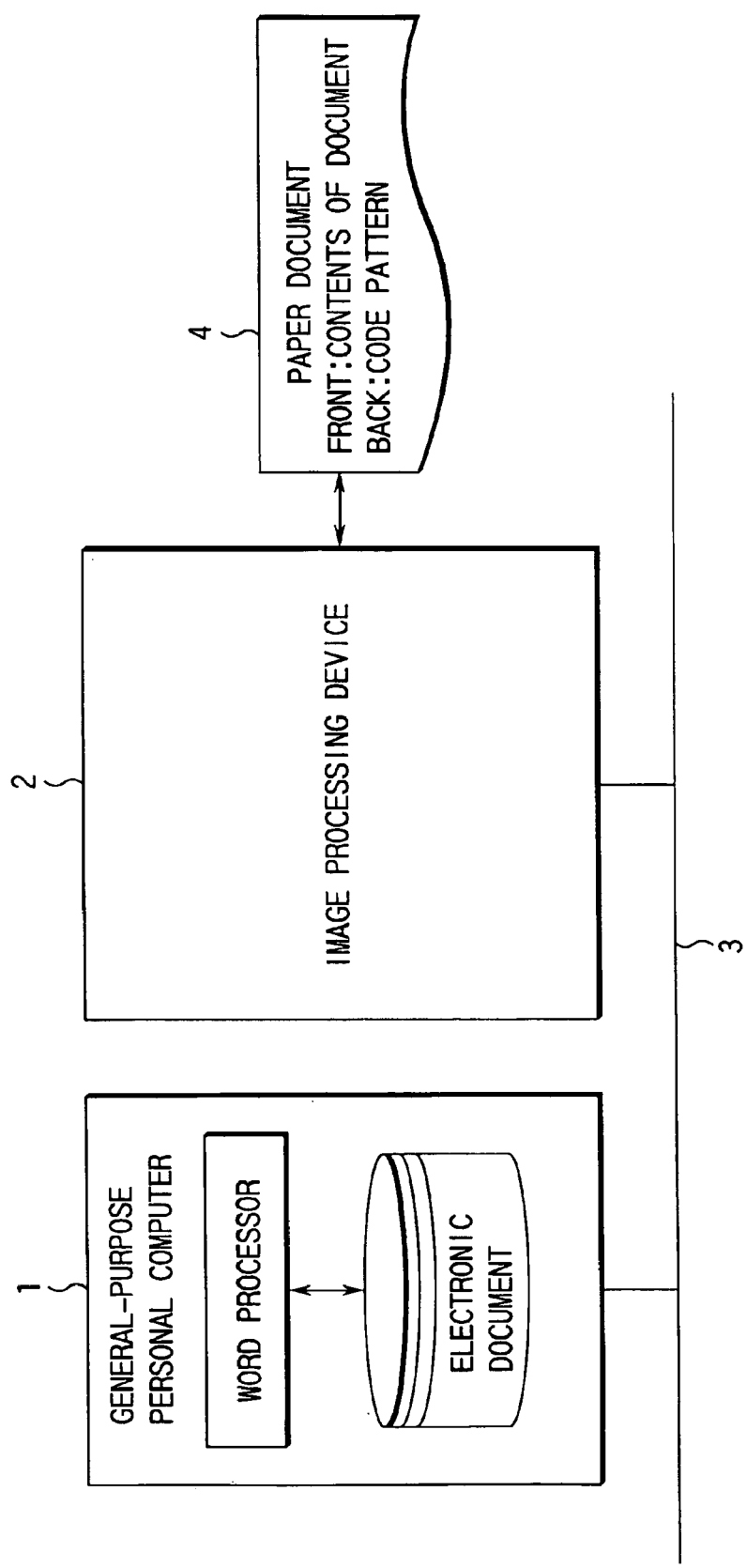
FIG. 1 is a block diagram schematically showing an image processing system according to an embodiment of the present invention.

FIG. 1 schematically shows a configuration of an image processing system according to an embodiment of the present invention. The system comprises e.g. a general-purpose computer (hereinafter simply referred to as "personal computer") 1, and an image processing device 2. They are connected together by a network 3.

The personal computer 1 creates electronic document data by activating a word processor based on built-in application software, and also activates a display and the image processing device 2 to print data. The word processor of the personal computer 1 is not described because it is already well-known in the art.

The image processing device 2 prints electronic document data created by the personal computer 1 on a printing medium, i.e. sheets of paper, and creates electronic document data based on a printed paper document 4.

Figure 2B:
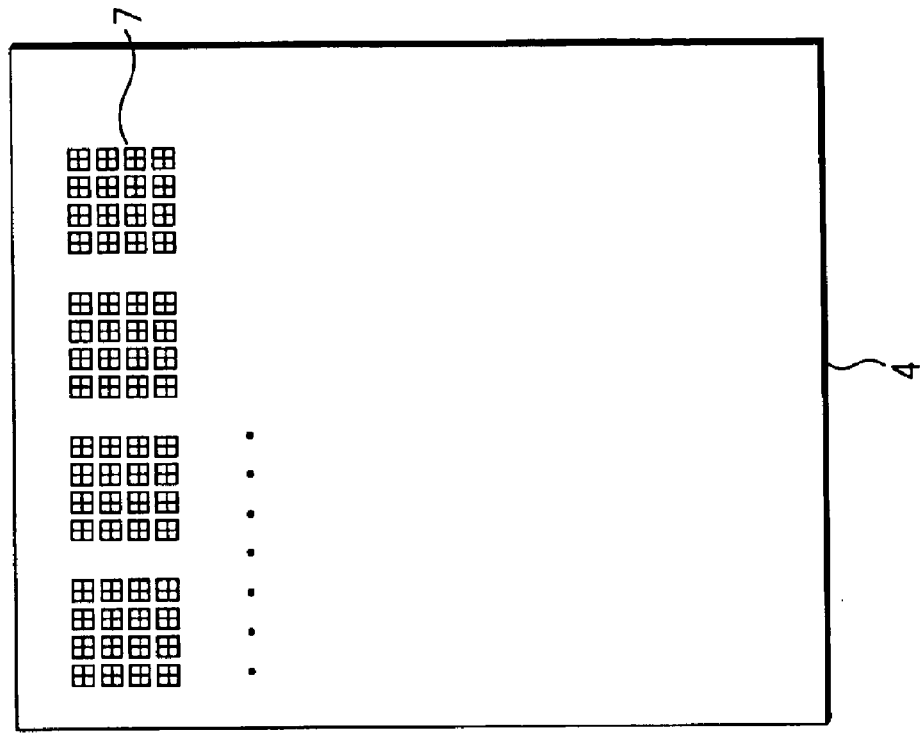
FIGS. 2A and 2B show an example of a paper document printed and output by the image processing apparatus.
Figure 2A:
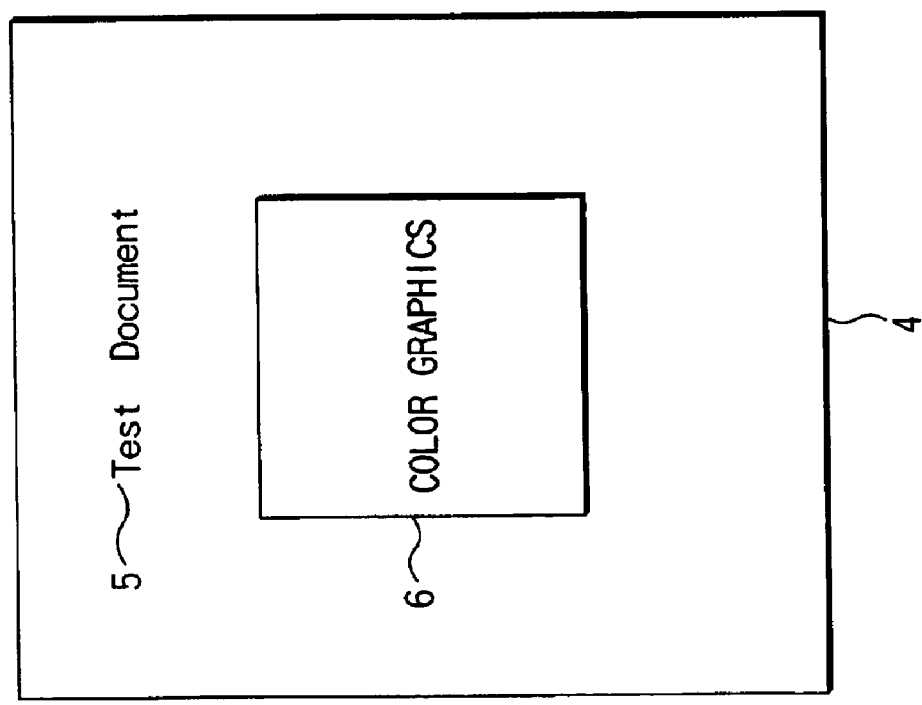

FIGS. 2A and 2B show an example of paper document 4 printed by the image processing device 2. FIG. 2A shows the front side, on which are printed human-recognizable document data such as character data 5 and image data 6, e.g. color graphics. FIG. 2B shows the back side of the sheet, on which are printed code patterns 7 which can be recognized by the image processing device 2 to create electronic document data. The code patterns 7 are e.g. one- or two-dimensional bar codes or griff code (trademark of Xerox USA).

While electronic document data are available in various formats, description is made here with reference to an example shown in FIG. 3. In this example, the image portion (image data) consists of 20000×2000 pixels with each pixel representing one byte (256 colors). The data size of the image data portion is therefore 4 Mbytes. The data size of the other portions of the electronic document data is about 100 bytes. Thus, it will be appreciated that the image data portion (underlined portion of FIG. 3) of the image command practically represents the entire size of the electronic document data.

The code patterns used in the embodiment are ones that can store 64-Kbyte data on an A4 sheet.

Figure 4:
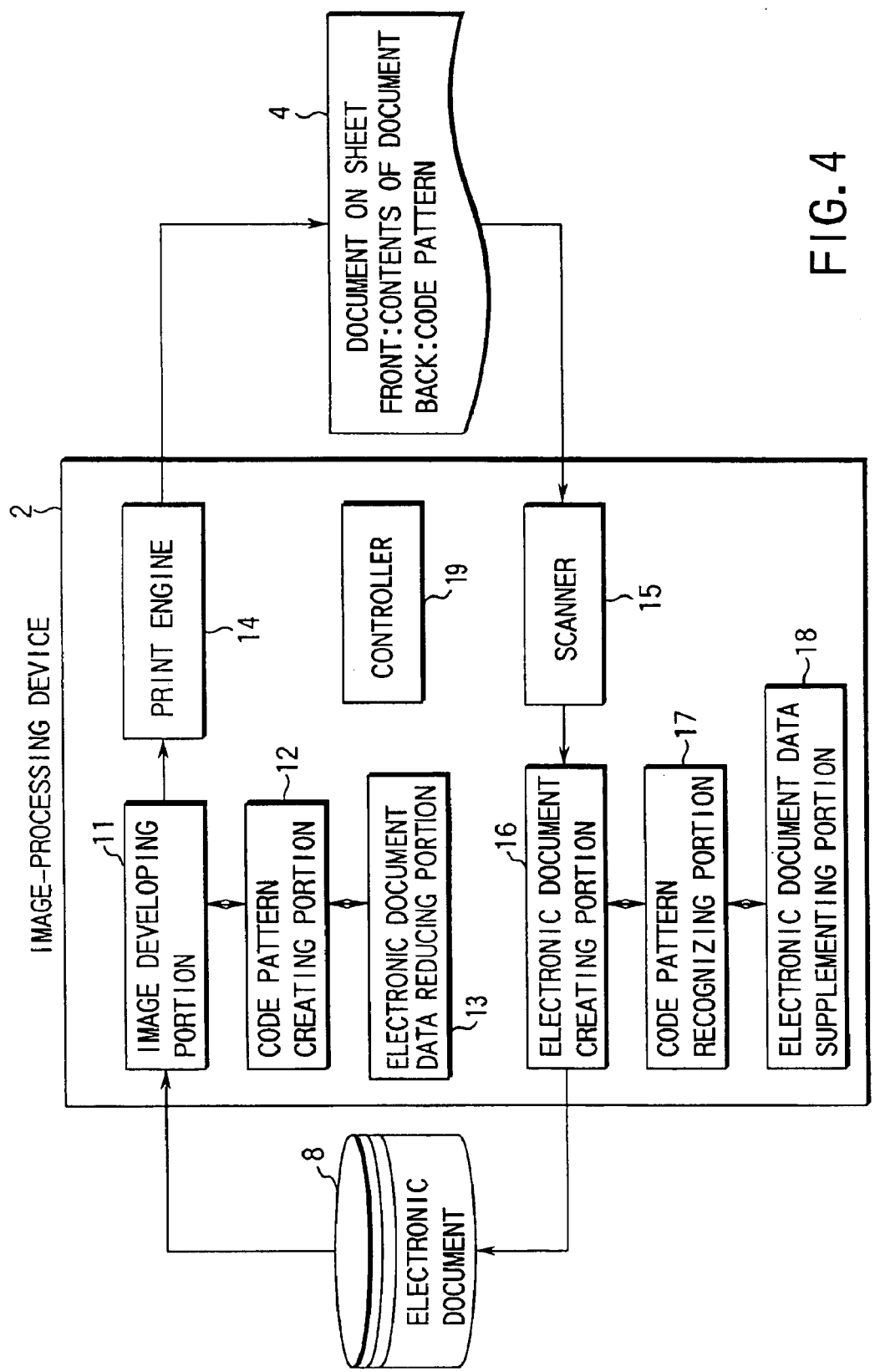
FIG. 4 is a detailed block diagram of the image processing apparatus.

FIG. 4 shows the detailed configuration of the image processing device 2. It comprises an image developing portion 11 as image developing means adapted to be activated during printing of electronic document data; a code pattern creating portion 12 as code pattern creating portion for encoding the electronic document data; electronic document data reducing portion 13 as data reducing portion for reducing the size of the electronic document data; a printing engine 14 as printing means for printing electronic document data and code patterns by electrophotographic processing on a paper sheet; a scanner 15 as image scanner adapted to be activated when the electronic document data are created; an electronic document creating portion 16 as electronic document creating portion for creating electronic document data, a code pattern recognizing portion 17 as code pattern recognizing means for recognizing the code patterns; and an electronic document data supplementing portion 18 as electronic document data supplementing means for supplementing data that has been reduced during printing. And finally, a controller is provided in the image forming device 2. The controller detects a status of this system and determines various actions in such a manner of the flowcharts shown in FIGS. 5 and 7.

Figure 5:
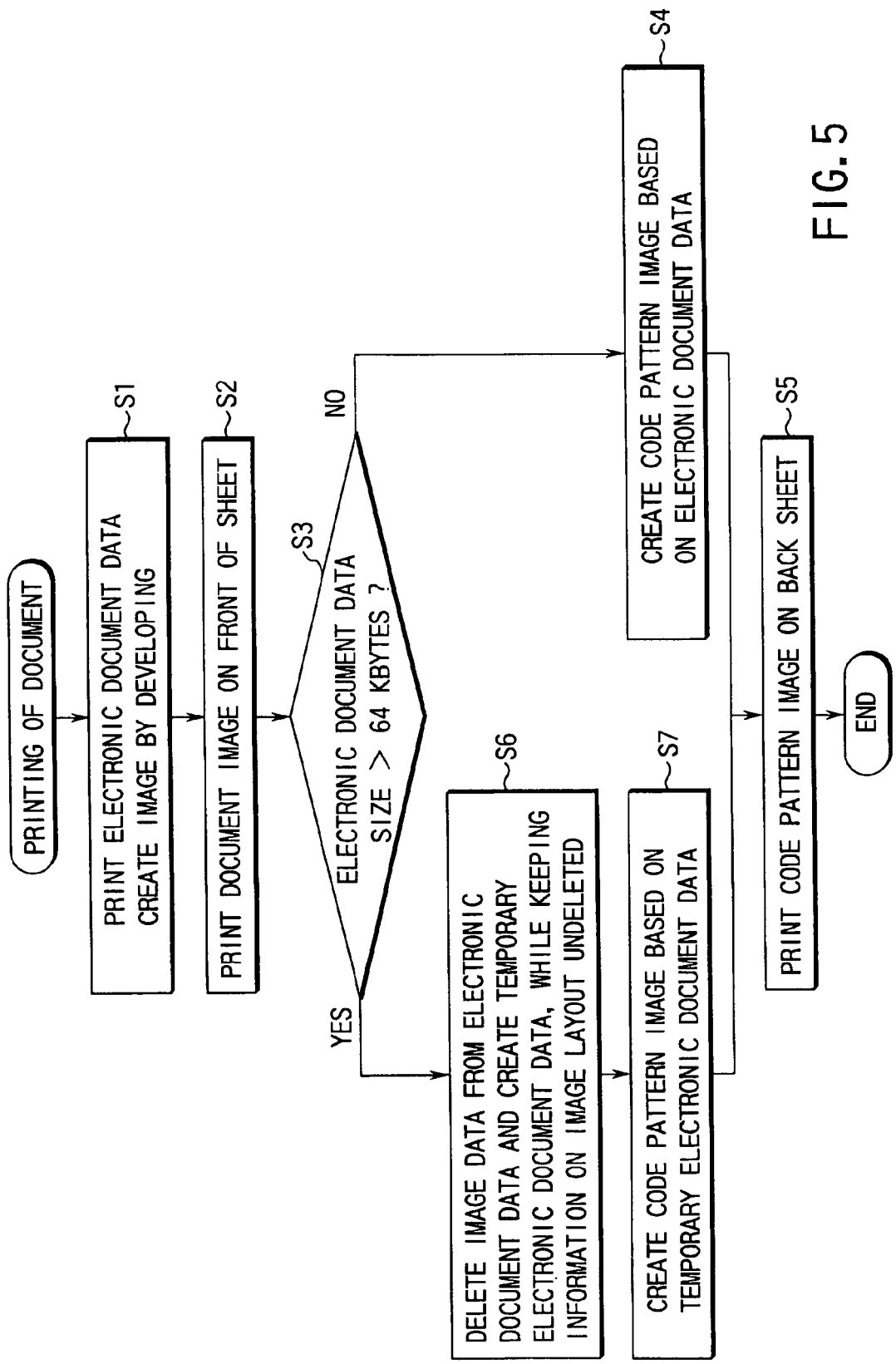
FIG. 5 is a flowchart showing the printing processing of electronic document data in the image processing apparatus.

How the image processing device 2 prints electronic document data is described with reference to the flowchart of FIG. 5. First, electronic document data 8 are developed into print images in the image developing portion 11. Specifically, in the example of FIG. 3, start of the page is recognized based on the page command; an image memory for developing print images corresponding to the sheet designated in the sheet command is retained; a font is selected based on the font command; character strings designated in the text command are drawn on the image memory retained; image data designated by the image command are developed in the image memory retained; and finally, the computer recognizes the completion of development of images based on the end command.

Then, the printing engine 14 prints images created in the image developing portion 11 on the sheet (S2).

In the next step (S3), the program compares the size of the electronic document data entered with a predetermined value (64 Kbytes in this embodiment) to check whether or not the code patterns corresponding to the electronic document data printed on the sheet can be entirely printed on the print area on the back of the sheet.

If the electronic document data size is 64 Kbytes or less, the corresponding code patterns are created in the code pattern creating portion 12 by encoding the electronic document data as it is (S4) because the code patterns can be entirely printed on the print area. Then, the printing engine 14 prints the code pattern image thus created on the back of the sheet (S5).

If the program determines that the size of the electronic document data exceeds 64 Kbytes in Step S3, the electronic document data reducing portion 13 reduces the size of the electronic document data to the predetermined value to create temporary electronic document data which can be entirely printed on the print area (S6).

Specifically, in this embodiment, the reducing portion 13 deletes e.g. only the image data in the electronic document data to create temporary document data corresponding to the character data. In such a case, only the image data are deleted with the image command itself retained. That is, the position data (x, y, width and height) in the image command, which represent the position of the image data in the document data, are retained. In this embodiment, the size of the temporary document data is about 100 bytes, so that the code patterns corresponding to the temporary data can be printed in the print area. FIG. 6 shows such temporary electronic document data, which do not include image data.

The code pattern creating portion 12 encodes the thus created temporary electronic document data to create code pattern images (S7). Finally, the print engine 14 prints the code pattern images on the back of the sheet (S5).

Figure 7:
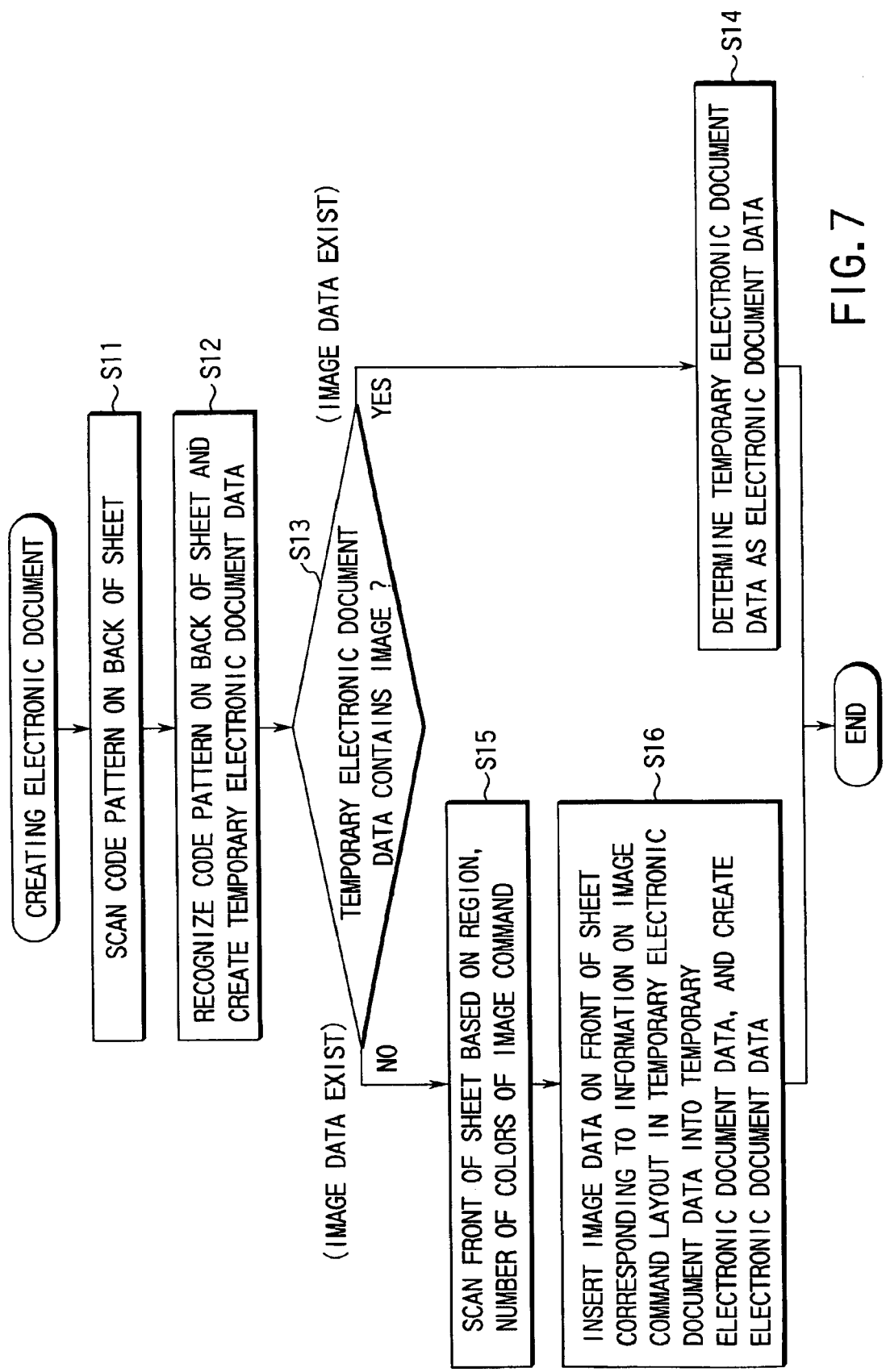
FIG. 7 is a flowchart showing the creating processing of electronic document data in the image processing apparatus.

The flowchart of FIG. 7 shows how the image processing device 2 creates electronic document image. First, the scanner 15 reads the code patterns 7 printed on the back of the paper sheet 4 (S16), and transmits the data thus read to the electronic document image creating portion 16. The latter then creates temporary electronic document data, that is, restore the original electronic document data by recognizing the code patterns read from the paper sheet 4 using the code pattern recognizing portion 12.

The electronic document creating portion 16 then determines whether or not the image command in the restored temporary electronic document data contains image data (S13). If there exist image data, which means that the electronic document data have been printed entirely with no image data deleted, the temporary electronic document data are regarded as the ultimate electronic document data 8 (S14).

If the electronic document creating portion 16 determines in Step S13 that there exist no image data, which means that the image data have been deleted, the electronic document data supplementing portion 18 acquires image data by scanning the front side of the paper sheet through the scanner 14 according to the position data (x, y, width and height) and parameters on the number of colors in the image command restored based on the code pattern read.

The image data thus acquired are incorporated into the temporary electronic document data to supplement the image data that have been deleted during printing, thereby creating the final electronic document data 8 (S16).

The electronic document data 8 thus created (restored) can be repeatedly printed by inputting the data 8 into the image developing portion 11 without the possibility of deterioration of the image quality. The data 8 may also be stored in an image memory (such as a hard-disk device) (not shown) in the image processing device 2 for later used.

The code patterns may be printed on an empty space on the front side of the sheet instead of on the back thereof or on a separate sheet. Also, the code patterns may be printed with an invisible ink.

In the embodiment, when data are printed, image data are deleted to reduce the size of the electronic document data to be converted to code patterns, and the image data thus deleted are added by scanning the front side of the sheet based on the positional data of the image data in the code patterns read when the electronic document data are created.

But instead, the size of the electronic document data may be reduced in other ways, e.g. by reducing the resolution or the number of colors of the image data to be converted to code patterns or by downloading the image data from a server on a separate network.

The present invention thus makes it possible to restore electronic document containing image data such as color graphics and thus large in data size and to relax the upper limit of the size of the electronic document data that can be printed on a sheet of paper.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image forming apparatus comprising:
   a controller for determining whether or not document data given have a capacity larger than a first predetermined value;
   a first code pattern creating portion for creating code patterns by encoding the document data, if the controller determines that the document data have a greater capacity than the first predetermined value;
   a reducing portion for reducing the document data by a second predetermined value, if the controller determines that the document data have a greater capacity than the first predetermined value;
   a second code pattern creating portion for encoding the document data reduced by the reducing portion to create code patterns;
   a print function for forming images on a recording medium based on the code patterns created by at least one of the first code pattern creating portion and the second code pattern creating portion;
   a scanner for reading the code patterns on the recording medium formed by the print function;
   a creating portion for recognizing the code patterns read by the scanner, and creating temporary document data based on the code patterns;
   a controller for determining whether or not there exist data deleted by the reducing portion based on the code patterns recognized by the creating portion;
   a controller for determining the temporary document data as final document data, if the controller determines that no data has been deleted from the code patterns; and
   a supplementing portion for acquiring predetermined data from data other than the code patterns and incorporating the predetermined data into the temporary document data created by the creating portion, if the controller determines that the predetermined data have been deleted from the code patterns to restore the final document data.

2. An image forming apparatus according to claim 1, wherein the scanner includes function for reading the code patterns formed on the back of the recording medium.

3. An image forming apparatus according to claim 1, wherein the supplementing portion includes
   function for restoring the final document data by incorporating predetermined data restored by reading images formed on the front side of the recording through the print function into the temporary document data created by the creating portion.

4. An image forming apparatus comprising:
   a scanner for reading code patterns on a recording medium;
   a creating portion for recognizing the code patterns read by the scanner and creating temporary document data based the code patterns;
   a controller for determining whether or not predetermined image data have been deleted based on the code patterns recognized by the creating portion;
   a controller for determining the temporary document data created by the creating portion as final document data, if the controller determines that no data have been deleted from the code patterns; and
   a supplementing portion for restoring predetermined data from data other than the code patterns and incorporating the restored predetermined data into the temporary document data created by the creating portion to restore the final document data, if the controller determines that the predetermined data have been deleted from the code patterns.

5. An image forming method comprising:
   a step of determining, by a controller, whether or not document data given have a capacity larger than a first predetermined value;

a step of encoding the document data as it is to create code patterns by a code pattern creating portion, if the controller determines that the document data have a capacity not exceeding the first predetermined value;

a step of reducing the document data by a second predetermined value by a reducing portion, if the controller determines that the document data have a capacity greater than the first predetermined value;

a step of encoding the document data reduced by the reducing portion, by a code pattern creating portion to create code patterns;

an image forming step of forming images by a print function on a recording medium based on the document data and the code patterns created in the code pattern creating portion;

a reading step of reading the code patterns, by the scanner, formed on the recording medium by a print function;

a step of recognizing the code patterns read by the scanner and creating temporary document data based thereon by an electronic document creating portion;

a step of determining by the controller whether or not there exist data that have been deleted by the reducing portion based on the code patterns recognized by the creating portion;

a step of determining the temporary document data created by the creating portion as final document data, if the controller determines that no data have been deleted from the code patterns; and a restoring step of restoring predetermined data by a supplementing portion from data other than the code patterns and incorporating the thus restored predetermined data into the temporary document data created by the creating portion to restore the final document data, if the controller determines that the predetermined data have been deleted from the code patterns in the reducing portion.

6. An image forming method according to claim 5, wherein the reading step includes a step of reading the code patterns, by the scanner, formed on the back of the recording medium by the print function.

7. An image forming apparatus according to claim 5, wherein the restoring step includes a step of incorporating predetermined data restored by the supplementing portion, by means of reading the images formed on the front side of the recording medium by the scanner formed by the print function, into the temporary document data, so as to restore the final document data, if the controller determines that the predetermined data have been deleted from the code patterns by the reducing portion.

8. An image forming apparatus comprising:

a step of reading code patterns on a recording medium by a scanner;

a step of recognizing the code patterns read by the scanner and creating temporary document data by a creating portion based thereon;

a step of determining by a controller whether or not predetermined image data have been deleted based on the code patterns;

a step of determining the temporary document data created by the creating portion as final document data, if the controller determines that no data have been deleted from the code patterns by a reducing portion; and a step of restoring predetermined data from data other than the code patterns and incorporating the thus restored data into the temporary document data created by the creating portion to restore the final document data by a supplementing portion, if the controller determines the predetermined data have been reduced from the code patterns.

\* \* \* \* \*